(12) United States Patent
Bai et al.

(10) Patent No.: US 8,105,705 B2
(45) Date of Patent: Jan. 31, 2012

(54) EXTERNAL FIELD ROBUSTNESS OF READ/WRITE HEAD SHIELDS

(75) Inventors: Zhigang Bai, Milpitas, CA (US); Yuchen Zhou, San Jose, CA (US); Joe Smyth, Aptos, CA (US); Moris Dovek, San Jose, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 36 days.

(21) Appl. No.: 12/589,598

(22) Filed: Oct. 26, 2009

(65) Prior Publication Data

US 2011/0097602 A1 Apr. 28, 2011

(51) Int. Cl.
*G11B 5/127* (2006.01)
*G11B 5/858* (2006.01)

(52) U.S. Cl. ............... 428/815; 216/38; 360/319

(58) Field of Classification Search ............ None
See application file for complete search history.

(56) References Cited

U.S. PATENT DOCUMENTS

| | | | |
|---|---|---|---|
| 7,212,379 B2 | 5/2007 | Hsu et al. | |
| 7,460,342 B2 * | 12/2008 | Guan et al. | 360/319 |
| 7,599,152 B2 * | 10/2009 | Guan et al. | 360/319 |
| 7,791,842 B2 * | 9/2010 | Guan et al. | 360/319 |
| 2006/0245113 A1 | 11/2006 | Guan et al. | |
| 2007/0035877 A1 * | 2/2007 | Maejima et al. | 360/122 |
| 2009/0034130 A1 * | 2/2009 | Garfunkel et al. | 360/319 |
| 2009/0323229 A1 * | 12/2009 | Guan et al. | 360/319 |
| 2010/0091413 A1 * | 4/2010 | Nunokawa et al. | 360/319 |

* cited by examiner

*Primary Examiner* — Kevin Bernatz
(74) *Attorney, Agent, or Firm* — Saile Ackerman LLC; Stephen B. Ackerman

(57) ABSTRACT

An improved magnetic shield for a perpendicular magnetic write head is disclosed. Its main feature is a pair of tabs at the shield's bottom corners. Said tabs are significantly wider at their point of attachment to the shield than further away from the shield. The end portions of each tab slope upwards (away from the ABS) at an angle of about ten degrees. A process for manufacturing the shield is also disclosed.

19 Claims, 8 Drawing Sheets

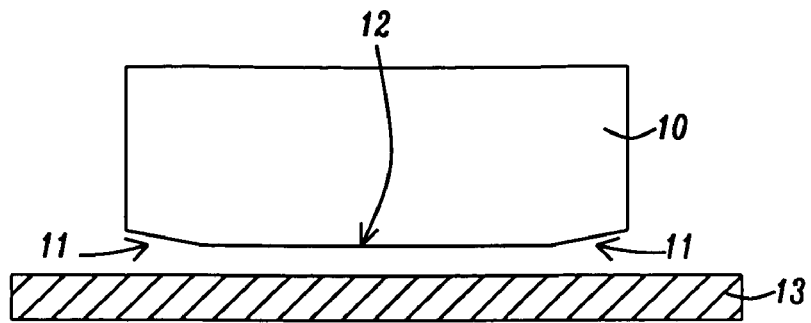
FIG. 1 - Prior Art
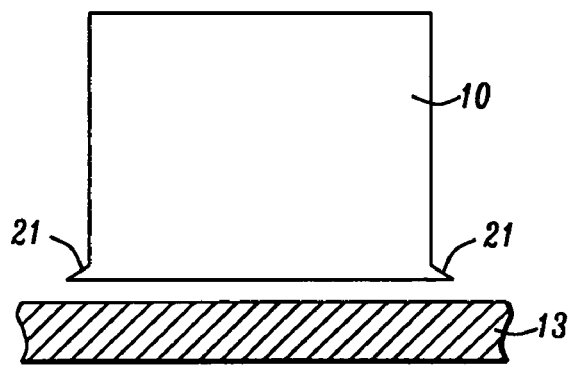
FIG. 2a - Prior Art
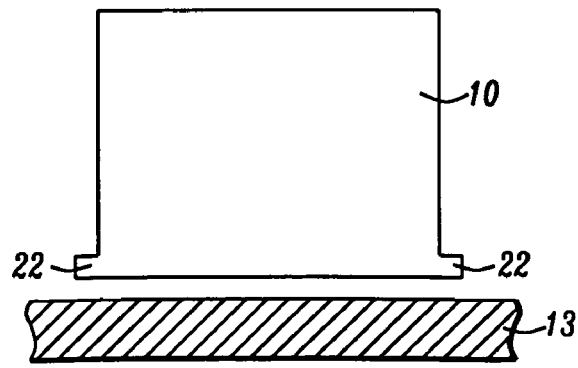
FIG. 2b - Prior Art

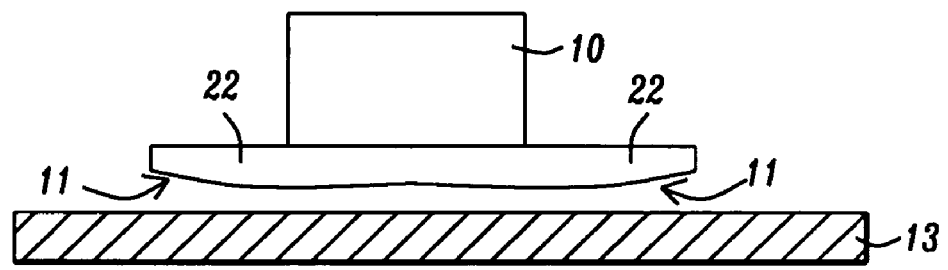
*FIG. 2c - Prior Art*
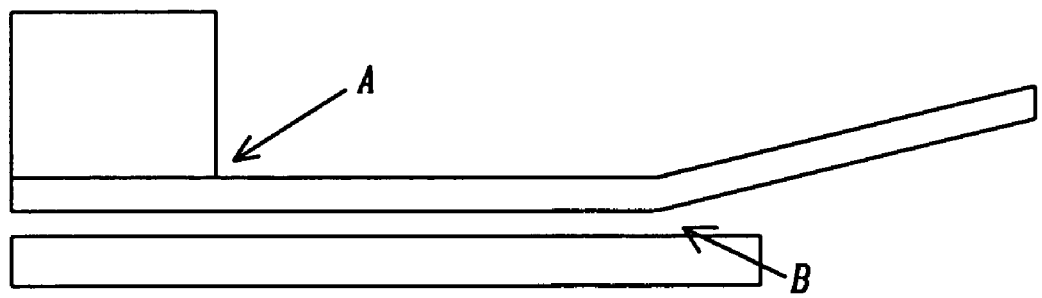
*FIG. 3*

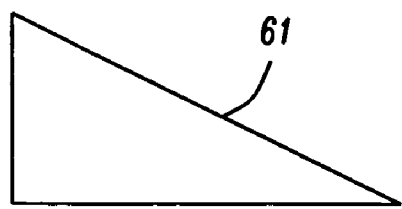
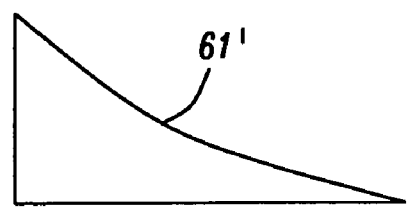
*FIG. 10a*   *FIG. 10b*
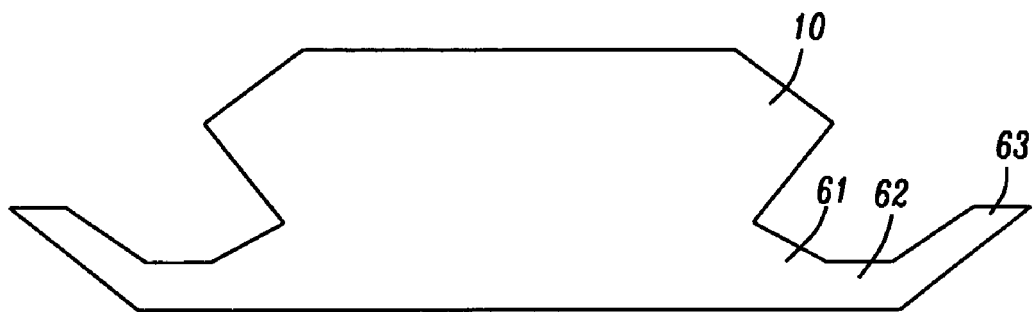
*FIG. 11a*
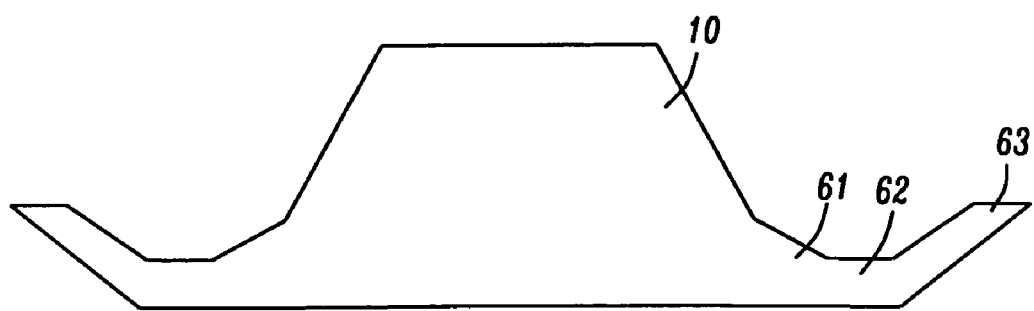
*FIG. 11b*

EXTERNAL FIELD ROBUSTNESS OF READ/WRITE HEAD SHIELDS

FIELD OF THE INVENTION

The invention relates to the general field of magnetic recording (and subsequent reading) devices with particular reference to the design of their internal magnetic shields.

BACKGROUND OF THE INVENTION

In perpendicular magnetic recording, a (magnetically) soft underlayer (SUL) is essential for enhancing the write field through the imaging effect of the main write pole. However, it also enhances stray fields at undesired locations, such as the corners of the reader/writer shields. This causes a shield erasure problem when the hard drive is subject to an external field. Efforts have been made to improve the external field robustness (EFR) for PMR head by modifying the shapes of the shields.

A simple example is shown in FIG. 1 where the main body 10 of the shield has been under-cut at its lower corner at a shallow angle 11 (from US 2006/0245114 A1 FIG. 5). Also shown in FIG. 1 is recording media 13. This shape is being used in today's products.

Another method involves extending tabs out from the sides of the shield. These could each have an end with a downward triangular shape (21 in FIG. 2a), a rectangular shape (22 in FIG. 2b), or with a shallow cut in the tab, as shown in FIG. 2c. Among the three shapes shown in FIG. 2, the tab with shallow cut at the ABS (air bearing surface) has the best EFR performance, as the other two have sharper corner ending at the ABS, which will cause more severe local charge build-up and thus higher erasure field. However, as shown below by finite element modeling (FEM), even the shallow cut tabbed design still has its limitations.

FIG. 3 shows FEM results for the tab with shallow cut under a 400 Oe external vertical field. For very thin tab thickness of 0.2 μm (FIG. 3a), demagnetization effects force the flux to stay in plane, thus eliminating the hot spot at the shallow cut corner (point B). There is, however, significant flux crowding and charge build-up at the corner (point A) where the tab meets the shield. As a result, this corner becomes the new erasure spot. On the other hand, FEM further shows that when the tab thickness is large (2 μm for FIG. 3b), the flux crowding at corner A is relieved, but the hot spot moves back to corner B due to the weakened demagnetization effect from the thicker tab.

FIG. 4 displays the maximum vertical field in the media at the two corners for different tab thicknesses. It clearly shows how the hot spot moves from A to B as the tab thickness increases, as a result of the two competing mechanisms. Since it is the maximum field among all locations that counts, FIG. 5 plots the maximum field (the greater of the two corner fields in FIG. 4 for each case) vs. the tab thickness, compared to a reference case, which is a standard shallow cut (FIG. 1 shape) with the same cut angle of 10 degree. This shows that only at a tab thickness of 1.0 μm is significant erasure field reduction vs. reference achieved. For tab thickness of 0.4 μm, or below, it is even worse than the reference.

These examples make it clear that improved EFR performance beyond what is available in the prior art is needed. This is the objective of the present invention.

The following patent applications describe several methods for improving EFR:

US patent application No. US 2006/0245113 A1 (Lijie Guan, Moris Dovek), and US patent application No. US 2006/0245114 A1 (Lijie Guan, Moris Dovek). A routine search of the prior art was also performed, with the following additional references of interest being found:

U.S. Pat. No. 7,460,342 (Guan et al-Headway) shows tapered shield edges while U.S. Patent Application 2005/0219747 (Hsu et al) shows a tapered trailing shield.

SUMMARY OF THE INVENTION

It has been an object of at least one embodiment of the present invention to provide a magnetic shield that is suitable for use with a perpendicular magnetic write head.

Another object of at least one embodiment of the present invention has been that there be no unwanted magnetic flux leaking from said shield with a potential to introduce write errors.

A further object of at least one embodiment of the present invention has been that such traces of flux that remain are in the plane of the shield and that there are no hot spots at any of the corners of the shield.

These objects have been achieved by adding a tab at each of the two lower corners of the shield. Each tab comprises three parts. The first part is attached to the main body of the shield, at which location it is relatively wide. Said width decreases as one moves away from the main body until the second part is reached. This second part has upper and lower surfaces that are parallel to the ABS. The third part has the same thickness as the second part but slopes upwards (away from the ABS) at an angle of about 10 degrees. The third part ends at a point where it is between about 0.2 and 3 microns above the ABS.

BRIEF DESCRIPTION OF THE DRAWINGS

FIG. 1. Prior Art shield with corner cut by a shallow angle.

FIGS. 2a-2c. Prior Art shield with tabs.

FIG. 3 FEM results of flux and field in the media underneath the tab area.

FIG. 10a. Shape of the tab-shield connection area for the primary embodiment.

FIG. 10b. Shape of the tab-shield connection area for an alternative embodiment.

FIGS. 11a and 11b show two alternative embodiments of the main body of the shield.

DESCRIPTION OF THE PREFERRED EMBODIMENTS

To illustrate the extensions we have made to the prior art discussed above, we now disclose a design that, while similar in part to shields with tabs (as in US 2006/0245114 for example) contains additional features that lead to further EFR improvements.

Figure 4:
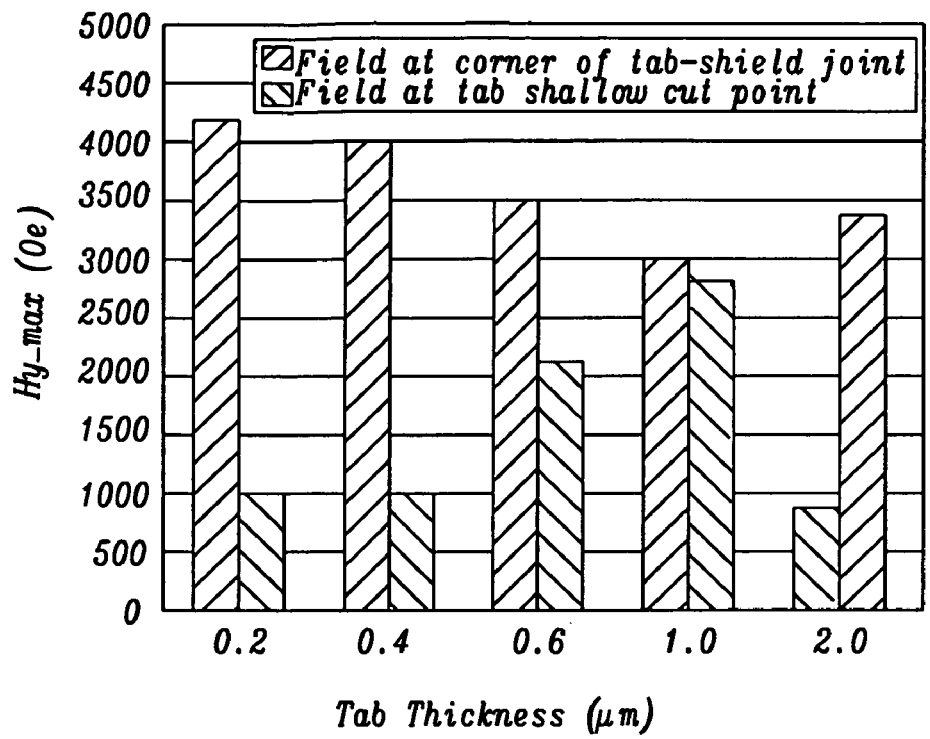
FIG. 4. Maximum vertical field in the media at the two corners vs. tab thickness.
Figure 5:
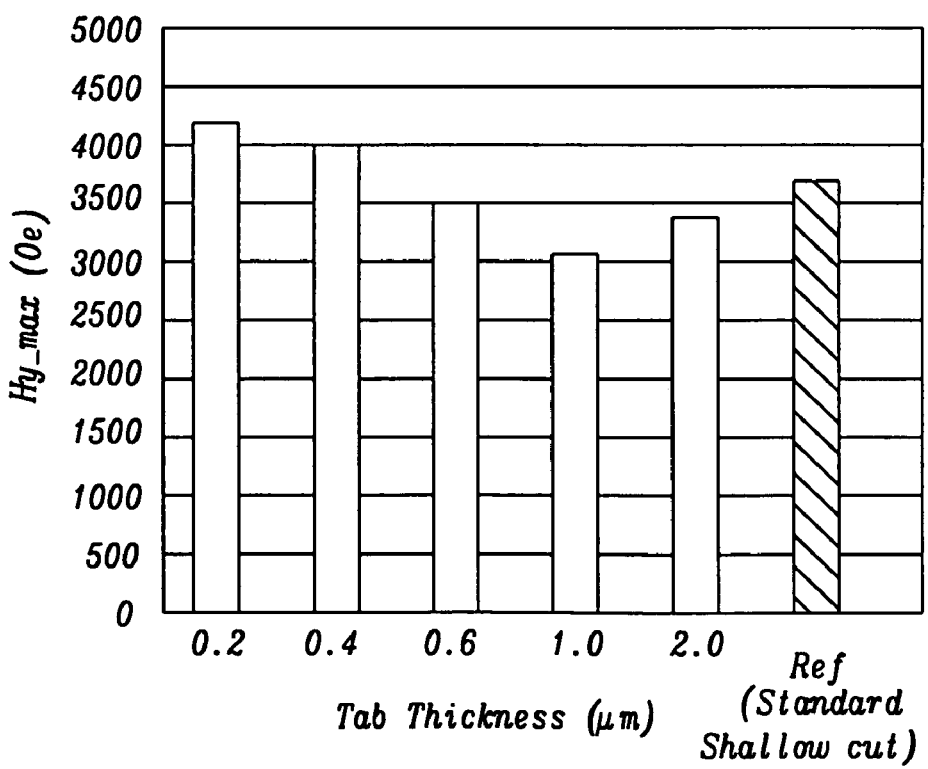
FIG. 5. Maximum vertical field (max of the two corner fields) vs. tab thickness, compared to reference case of a standard shallow cut.
Figure 6A:
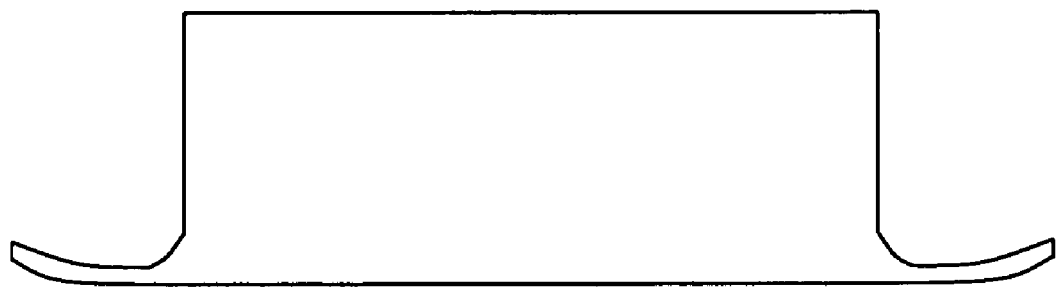
FIG. 6a. Primary embodiment of the invention.
Figure 6B:
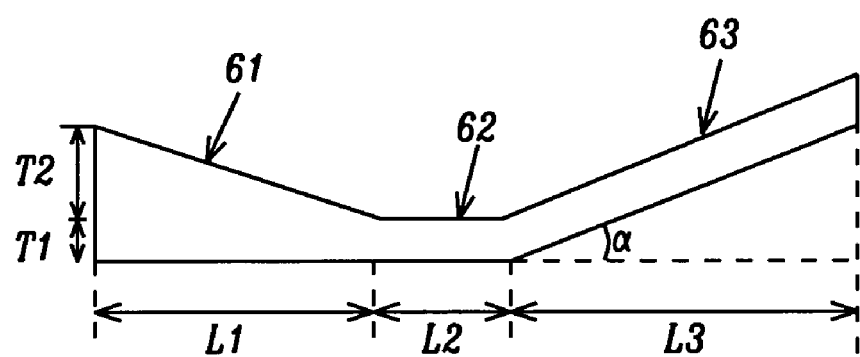
FIG. 6b. Close-up view of tab section (within the dashed line) of the primary embodiment FIG. 7. FEM results of flux and field in the media for the primary embodiment's tab section.

In FIG. 6a we show what we will refer to as the primary embodiment. Its key features are critical for achieving improved performance. They are detailed in FIG. 6b and include following:

1). At the joint location where the tab meets the (normally rectangular) main body of the shield, the tab has a much larger thickness (T2) than it has at the center region of the tab (T1), said thickness gradually decreasing when going from the shield into the tab, thereby assuming a triangular shape when viewed from the side.

2). Toward the tail end of the tab, instead of staying parallel to the air bearing surface (ABS) (as in prior art FIGS. 2b and 2c) or going downward toward the ABS (FIG. 2a), it slopes away from the ABS, roughly following the shape of the tab's shallow cut (angle α) on the ABS-facing side.

3). The thickness of the tab at flat region T1 is kept low, preferably around 0.5 µm. As shown below, the combination of these features assures that, in the presence of an external field, the flux is evenly dispersed along the tab, without forming hot spots either at the tab-shield joint location or at the ABS shallow cut location of the tab.

Figure 7:
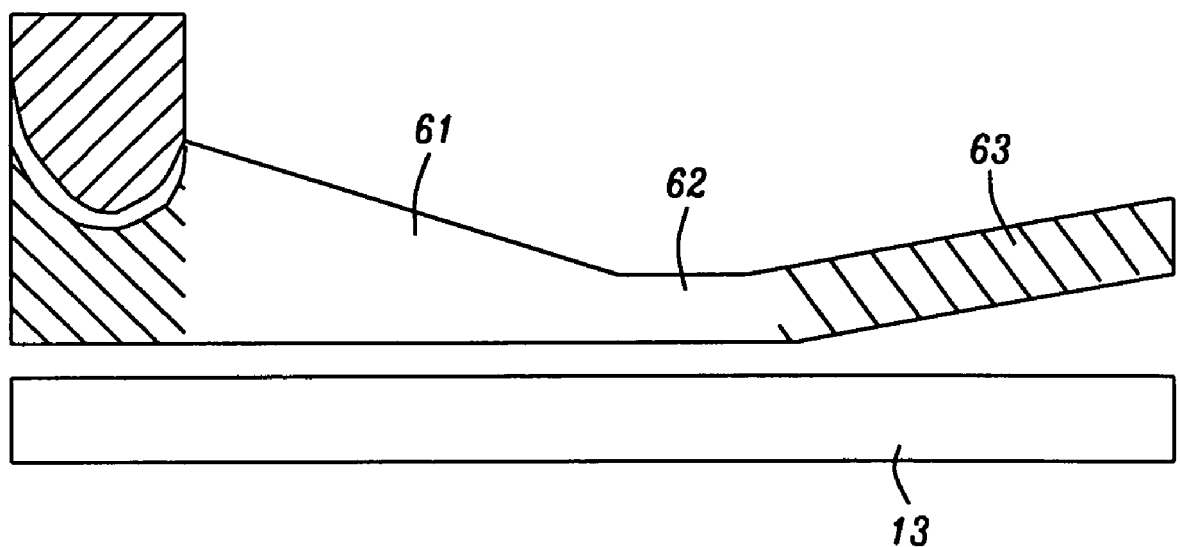

FIG. 7 shows FEM results for the primary embodiment in a vertical external field of 400 Oe. It is evident that, due to the widened connection area, it facilitated smoother flux flow from the shield into the tab without creating a hot spot at the tab-shield joint location. Additionally, the tab is thin enough to force the flux to stay parallel to the ABS, thereby causing the field at the shallow cut point of the tab to also be low.

Figure 8:
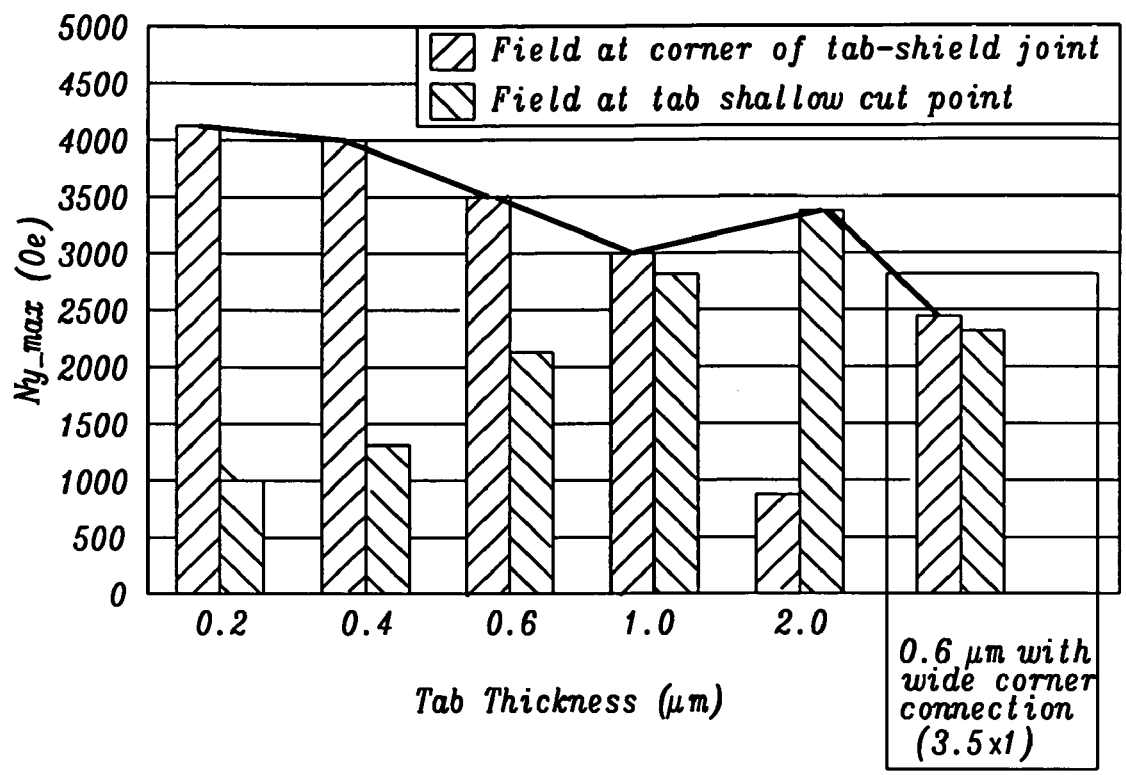
FIG. 8. Erasure field comparison of invention (last column) vs. simple shallow cut tab designs.

FIG. 8 compares the field at the two corners (points A and B in FIG. 3) for the invention (0.6 µm tab thickness) vs. the prior art's simple tabbed shield with shallow cut. The invention achieved a better balance between the two corners than ALL other tabbed designs.

Figure 9:
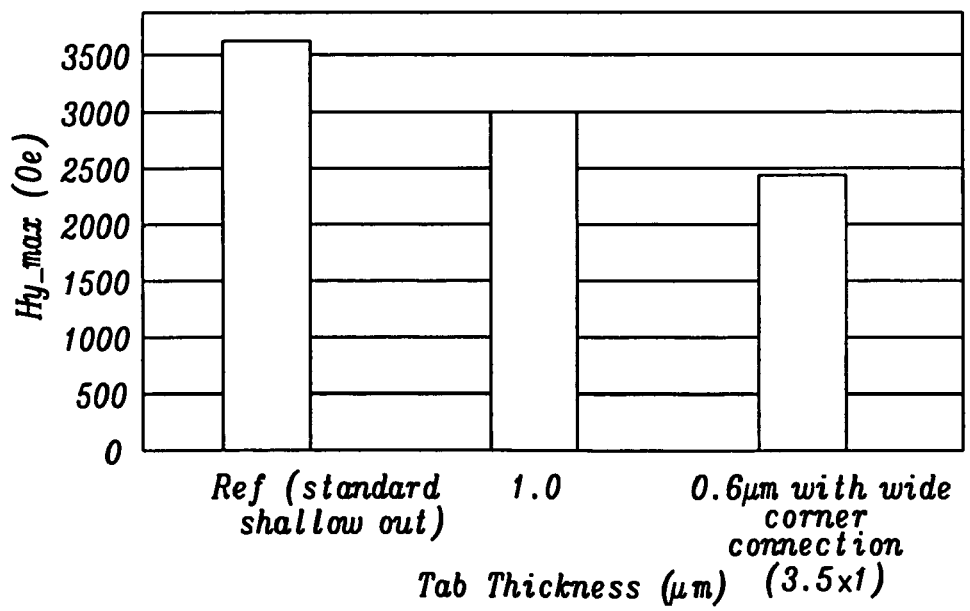
FIG. 9. Comparison of maximum erasure field for the invention (right) vs. standard shallow cut (left) and the best shallow cut tab design (1.0 um tab thickness, center).

FIG. 9 compares the maximum erasure field for the invention (rightmost histogram) vs. the shallow cut reference design (leftmost histogram) and the best tab design with shallow cut (1.0 µm tab thickness, center histogram). Note that the invention has resulted in a reduction of the erasure field of 34% and 19%, respectively, over the two other designs. The taper-up of the upper side of the tab is necessary, for both performance and manufacturability, because, if left flat, it would have a very sharp corner close to the ABS due to the small thickness of the tab. On the one hand this creates another magnetic hot spot and, on the other hand, it makes the deposition of the shield material inside the narrow trench very difficult. The range and preferred value of each parameter are shown in TABLE I below (see FIG. 6b for particulars):

TABLE I

|  | min | max | preferred |
|---|---|---|---|
| L1 (um) | 1 | 6 | 3 |
| L2 (um) | 0 | 5 | 2 |
| L3 (um) | 2 | 10 | 5 |
| T1 (um) | 0.2 | 2 | 0.5 |
| T2 (um) | 0.5 | 3 | 1 |
| α (degree) | 5 | 20 | 10 |

Note that preferred ranges for the parameters listed in TABLE I are ±10% of the values shown Other Embodiments Instead of a right triangular shape at the tab-shield connection area (FIG. 10a), it can have a downward curving (i.e. concave) shape at its upper edge, as shown in FIG. 10b. FIGS. 11a and 11b illustrate two possible modifications of the main body's shape. The main body illustrated in FIG. 11a has a hexagonal shape, with its two longest sides disposed to be parallel to the ABS. The main body illustrated in FIG. 11b has a trapezoidal shape; its parallel sides are parallel to the ABS, the longer of these being the closest to the ABS. Both are shown as connected to the tab structures as illustrated in FIG. 10a but they could equally well have been connected through the type of structure illustrated in FIG. 10b. The advantage of these shapes over the conventional rectangular shape is the improved stability of the domains in the body of the shields—making for better performance and stability of the reader.

Figure 12A:
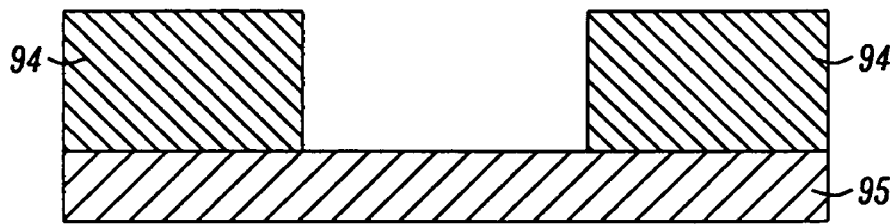
FIGS. 12a-12c shows the principal steps in the manufacture of the present invention.
Figure 13:
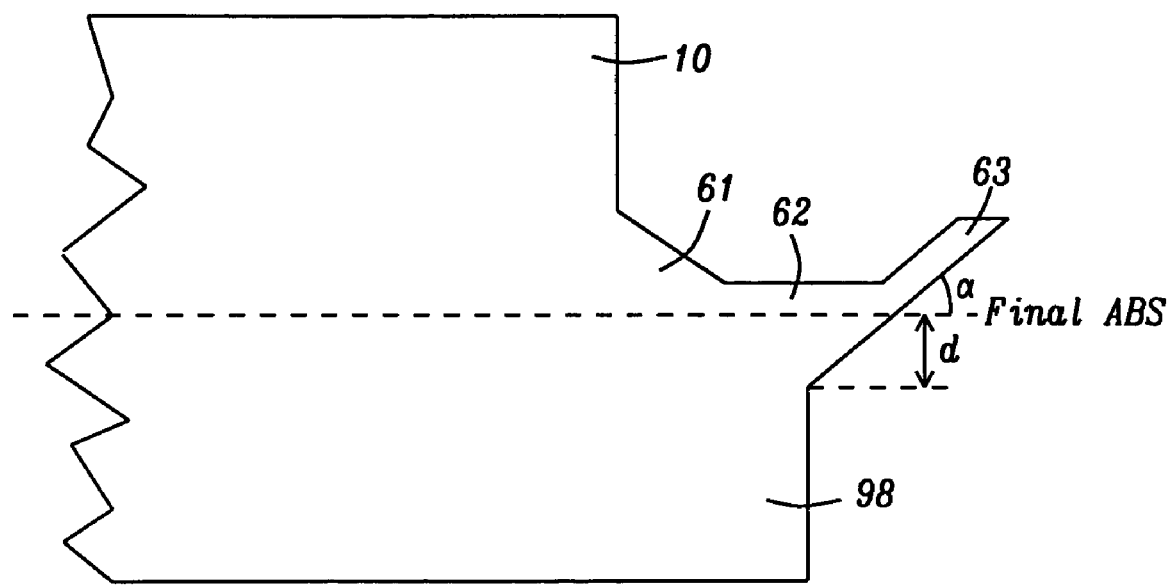
FIG. 13 shows the completed shield prior to formation of the ABS.

Manufacturing Process:

Referring now to FIG. 12a, we begin a description of a general process for the manufacture of any, or all, of the shields that have been described above:

The process begins with the provision of suitable substrate 95 (for example the cap layer of a completed write pole) onto which is deposited a conductive seed layer (not shown). Photoresist is then deposited on this seed layer and patterned to form mold 94. The inner walls of mold 94 define the future shape of the shield as described in detail above. Note that, as can be seen in FIG. 13, the mold pattern includes added lower part 98 which extends away from main body 10. Eventually lower part 98 will be ground away as part of the normal process for forming the ABS.

Figure 12B:
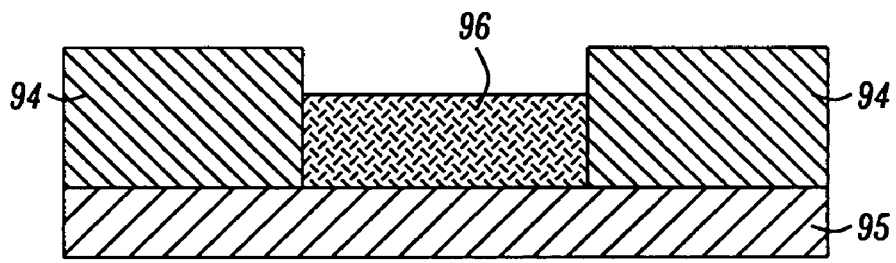
Figure 12C:
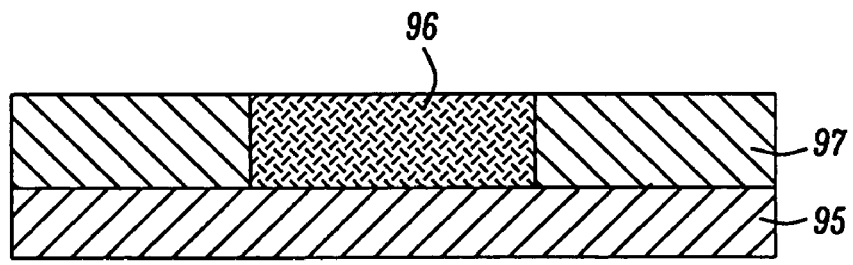

Returning now to FIG. 12b, layer of material 96, suitable to serve as a magnetic shield, is now electro-deposited on the seed layer inside the walls of the mold. The photoresist is then stripped away and layer of dielectric 97 (typically aluminum oxide) is then deposited over the entire structure. Finally, CMP is performed to remove excess dielectric, as illustrated in FIG. 12c, and the process is complete.

SUMMARY

Uniqueness

A shield with tabs on either side that ends at the ABS, with small tab thickness (from ABS inside) of ~0.5 µm. The tab-shield joint area has a triangular shape (or the longest leg may have a downward curved shape) in side view whereby the tab thickness at the tab-shield joint (0.5-3 µm with 1.5 µm being preferred) is much larger than the tab thickness at the flat region of the tab.

The end of the tab tapers away from the ABS, both on the shallow cut on the ABS and on the back side.

Advantages:

Robust EFR improvement (>20% erase field reduction over current design).

Process is manufacturing friendly. Only a mask change is involved, no additional process changes needed.

What is claimed is:

1. A shield for use in a perpendicular magnetic recording device, comprising:

a main body having a single pair of corners on opposing sides of a lower edge that is also an air bearing surface (ABS);

a single tab attached to each of said corners, each such tab extending away from said main body in a direction that is initially parallel to said ABS;

each of said tabs being composed of first, second, and third portions;

each said first portion having a first lower surface, that is an extension of said lower edge, and a first upper surface that contacts said main body along a line that is at least 1 micron above said lower edge;

each said first upper surface sloping away from said line towards each said first lower surface until it is between 0.2 and 2 microns from said first lower surface and closer to the respective first lower surface than at the contact portion with the main body;

each said second portion being directly attached to said first portion and having a second lower surface, that is an extension of said first lower surface;

each said second portion having a second upper surface, that is parallel to said second lower surface, there being no step where said first and second upper surfaces meet;

each said third portion being directly attached to said second portion;

each said third portion having a third upper surface that is parallel to a third lower surface, being spaced there from between 0.2 and 2 microns; and each said third portion being oriented so as to point away from said ABS at an angle that is between 5 and 20 degrees relative to said ABS.

2. The shield described in claim 1 wherein said first portion has a length of between 1 and 6 microns.

3. The shield described in claim 1 wherein said second portion has a length of no more than 5 microns.

4. The shield described in claim 1 wherein said third portion has a length of between 2 and 10 microns.

5. The shield described in claim 1 wherein said first upper surface is planar.

6. The shield described in claim 1 wherein said first upper surface is concave.

7. The shield described in claim 1 wherein said second upper and lower surfaces are from 0.2 to 2 microns apart.

8. The shield described in claim 1 wherein said main body has a rectangular shape.

9. The shield described in claim 1 wherein said main body has a hexagonal shape.

10. The shield described in claim 1 wherein said main body has a trapezoidal shape.

11. A process to manufacture a structure suitable for shielding a perpendicular magnetic recording head, comprising:

providing a substrate and depositing thereon a conductive seed layer;

depositing a layer of photoresist on said conductive seed layer;

then processing said layer of photoresist to form a mold whose inner walls define a pattern comprising a main part connected, along a future ABS line, to a disposable part;

said pattern further comprising a pair of opposing tabs, each of which extends away from said main part in a direction that is initially parallel to said future ABS line;

each of said tabs being composed of first, second, and third portions;

each said first portion having a first lower surface, that is an extension of said future ABS line, and a first upper surface that originates at said main body at a point that is at least 1 micron above said future ABS line;

said first upper surface sloping away from said point towards each said first lower surface until it is between 0.2 and 2 microns from said first lower surface and closer to the respective first lower surface than at the contact portion with the main body;

each said second portion being a continuation of said first portion and having a second lower surface, that is an extension of said first lower surface;

each said second portion having a second upper surface, that is parallel to said second lower surface, there being no step where said first and second upper surfaces meet;

each said third portion being a continuation of said second portion;

each said third portion having a third upper surface that is parallel to a third lower surface, being spaced therefrom between 0.2 and 2 microns;

said third portion being oriented so as to point away from said disposable part at an angle of from 5 to 20 degrees relative to said future ABS line;

then electro-depositing a layer of material, suitable to serve as a magnetic shield, on said conductive seed layer;

removing all photoresist;

depositing a dielectric layer onto all exposed surfaces; and then planarizing said structure through use of chemical mechanical polishing.

12. The process recited in claim 11 wherein said dielectric layer is aluminum oxide.

13. The process recited in claim 11 wherein said layer of material, suitable to serve as a magnetic shield, is NiFe or CoNiFe.

14. The process recited in claim 11 wherein said layer of material, suitable to serve as a magnetic shield, is deposited to a thickness in a range of from 0.2 to 2 microns.

15. The process recited in claim 11 wherein said conductive seed layer is selected from the group consisting of copper, NiFe, CoFe, CoNiFe, Ru, Cr, Ti, Ta, and Au.

16. The process recited in claim 11 wherein said structure is also used to shield a GMR read head.

17. The process recited in claim 11 wherein said structure is also used to shield a MTJ read head.

18. The process recited in claim 11 wherein said substrate is a capping layer of a perpendicular magnetic write head.

19. The process recited in claim 11 wherein said substrate is a planarized AlTiC wafer coated with $Al_2O_3$ for formation of a first reader shield, or a finished reader sensor ready for a second reader shield deposition, or a second reader shield ready to receive a first writer shield.

\* \* \* \* \*